(12) United States Patent
Ji et al.

(10) Patent No.: US 11,631,878 B2
(45) Date of Patent: Apr. 18, 2023

(54) METHOD OF MANUFACTURING SOLID OXIDE FUEL CELL INCLUDING MULTI-LAYERED ELECTROLYTE LAYER USING CALENDERING PROCESS

(71) Applicant: KOREA INSTITUTE OF SCIENCE AND TECHNOLOGY, Seoul (KR)

(72) Inventors: Ho Il Ji, Seoul (KR); Jong Ho Lee, Seoul (KR); Byung Kook Kim, Seoul (KR); Ji Won Son, Seoul (KR); Kyung Joong Yoon, Seoul (KR); Hyoung Chul Kim, Seoul (KR); Sang Baek Park, Seoul (KR); Sung Eun Yang, Seoul (KR); Jun Seok Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 112 days.

(21) Appl. No.: 17/212,261

(22) Filed: Mar. 25, 2021

(65) Prior Publication Data
US 2022/0158209 A1 May 19, 2022

(30) Foreign Application Priority Data
Nov. 18, 2020 (KR) .................. 10-2020-0154416

(51) Int. Cl.
*H01M 8/1253* (2016.01)
*H01M 4/90* (2006.01)
(Continued)

(52) U.S. Cl.
CPC ....... *H01M 8/1253* (2013.01); *H01M 4/8657* (2013.01); *H01M 4/8828* (2013.01);
(Continued)

(58) Field of Classification Search
None
See application file for complete search history.

(56) References Cited

U.S. PATENT DOCUMENTS 5,702,837 A 12/1997 Xue
2008/0124602 A1 5/2008 Larsen et al.
(Continued)

FOREIGN PATENT DOCUMENTS

KR 10-2008-0047282 A 5/2008
KR 10-0958514 B1 5/2010
(Continued)

OTHER PUBLICATIONS

Kim et al., "Solid oxide fuel cells with zirconia/ceria bilayer electrolytes via roll calendering process", Journal of Alloys and Compounds, 2020, vol. 846, 156318, total 9 pages.
(Continued)

*Primary Examiner* — Haroon S. Sheikh
(74) *Attorney, Agent, or Firm* — Birch, Stewart, Kolasch & Birch, LLP

(57) ABSTRACT

Disclosed is a method of manufacturing a solid oxide fuel cell including a multi-layered electrolyte layer using a calendering process. The method for manufacturing a solid oxide fuel cell is a continuous process, thus providing high productivity and maximizing facility investment and processing costs. In addition, the solid oxide fuel cell manufactured by the method includes an anode that is free of interfacial defects and has a uniform packing structure,
(Continued)

thereby advantageously greatly improving the production yield and power density. In addition, the solid oxide fuel cell has excellent interfacial bonding strength between respective layers included therein, and includes a multi-layered electrolyte layer in which the secondary phase at the interface is suppressed and which has increased density, thereby advantageously providing excellent output characteristics and long-term stability even at an intermediate operating temperature.

20 Claims, 16 Drawing Sheets

(51) Int. Cl.
*H01M 4/88* (2006.01)
*H01M 4/86* (2006.01)
*H01M 8/12* (2016.01)

(52) U.S. Cl.
CPC ....... *H01M 4/8857* (2013.01); *H01M 4/8885* (2013.01); *H01M 4/8896* (2013.01); *H01M 4/9025* (2013.01); *H01M 2008/1293* (2013.01)

(56) References Cited

U.S. PATENT DOCUMENTS

| | | |
|---|---|---|
| 2013/0052562 A1 | 2/2013 | Yoon |
| 2021/0151773 A1* | 5/2021 | Lee ..................... H01M 4/8807 |
| 2021/0175517 A1* | 6/2021 | Li ....................... H01M 8/1213 |

FOREIGN PATENT DOCUMENTS

| | | |
|---|---|---|
| KR | 10-1072137 B1 | 10/2011 |
| KR | 10-2013-0043948 A | 5/2013 |
| KR | 10-1288407 B1 | 7/2013 |
| KR | 10-2014-0085431 A | 7/2014 |
| KR | 10-2020-0049114 A | 5/2020 |

OTHER PUBLICATIONS

Lewis et al., "Cobalt additive for lowering the sintering temperature of yttria-stabilized zirconia," Journal of Materials Science Letters, vol. 20, 2001, pp. 1155-1157.

Tarutin et al., "One-Step Fabrication of Protonic Ceramic Fuel Cells Using a Convenient Tape Calendering Method," Applied Sciences, vol. 10, 2020, pp. 1-9.

* cited by examiner

METHOD OF MANUFACTURING SOLID OXIDE FUEL CELL INCLUDING MULTI-LAYERED ELECTROLYTE LAYER USING CALENDERING PROCESS

CROSS-REFERENCE TO RELATED APPLICATION

This application claims, under 35 U.S.C. § 119(a), the benefit of priority to Korean Patent Application No. 10-2020-0154416 filed on Nov. 18, 2020, the entire contents of which are incorporated herein by reference.

BACKGROUND

(a) Technical Field

The present invention relates to a method of manufacturing a solid oxide fuel cell including a multi-layered electrolyte layer using a calendering process.

(b) Background Art

Solid oxide fuel cells (hereinafter, referred to as "SOFCs") are attracting great attention as next-generation energy technology for converting chemical energy into electric energy. SOFCs operate at a high temperature, which is electrically and electrochemically advantageous, and have relatively high efficiency and performance.

However, the high-temperature operating environment causes problems of increased prices of SOFC system components and accelerated deterioration of devices. Efforts have been continuously made to maintain high efficiency, which is an advantage of SOFCs, while reducing the conventional operating temperature of 800 to 1,000° C. to an intermediate temperature range of 800° C. or less in order to realize cost reduction and long-term stability. The recent research trend focuses on achieving high efficiency and high performance by using electrolytes having high ion conductivity and highly active cathode materials in the intermediate temperature region.

Meanwhile, gadolinium-doped ceria (GDC), which is used as an electrolyte material for SOFCs, has higher ion conductivity in the intermediate temperature region than yttria-stabilized zirconia (YSZ), which is a representative electrolyte material of SOFCs, and excellent chemical compatibility with high-performance cathodes such as $La_{1-x}Sr_xCo_{1-y}Fe_yO_3$ (LSCF), which is known to produce a high-resistance secondary phase through a high-temperature chemical reaction with YSZ, thus being considered to be an electrolyte suitable for intermediate-temperature SOFC. However, GDC exhibits electronic conductivity in a reducing atmosphere and thus has limitations as an oxygen-ion-conductive electrolyte, so a YSZ/GDC bi-layered electrolyte, in which the YSZ layer is interposed between the anode and the GDC, is used as an optimal structure of the electrolyte of the intermediate-temperature SOFC. In other words, YSZ, which has excellent ion conductivity even in a reducing atmosphere, serves to inhibit electron conduction, and GDC serves as an electrolyte having excellent chemical compatibility with the cathode and high ion conductivity.

A general bi-layered electrolyte-based anode support planar cell used in an SOFC stack is produced as follows. An anode support tape is produced by tape-casting, and is then pressed using a uniaxial pressing device to produce an anode.

Then, a YSZ electrolyte is applied onto the anode by screen printing and is sintered in a general sintering furnace at a high temperature of 1,350° C. or higher to produce an anode/YSZ structure. GDC is applied onto the sintered dense YSZ by screen printing, and then is sintered at a high temperature of 1,250° C. or higher to form a YSZ/GDC bi-n layered electrolyte. However, the single cell fabricated through the above process is characterized by a technical difficulty in densifying the GDC on the pre-sintered dense YSZ through an additional sintering process. The reason for this is that the dense YSZ suppresses the sintering shrinkage of GDC, particularly in the horizontal direction, and the difference in strain between YSZ and GDC weakens the mechanical strength of the YSZ/GDC interface, and in severe cases may cause interfacial delamination. In addition, when the sintering temperature of GDC is 1,250° C. or higher, a secondary phase having low conductivity is produced at the YSZ/GDC interface through a high-temperature chemical reaction between YSZ and GDC, resulting in high bi-layered electrolyte resistance and thus a performance reduction. In addition, a total of two sintering processes is required, thus inevitably increasing processing costs.

Therefore, in order to improve the performance of SOFC and reduce the price thereof, there is increasing need to implement an SOFC containing a multilayered electrolyte that is structurally dense and has excellent interfacial properties while suppressing the formation of the interfacial reaction layer by lowering the temperature of the sintering process as much as possible.

PRIOR ART DOCUMENT

Non-Patent Document (Patent Document 1) Korean Patent No. 10-0958514
(Patent Document 2) Korean Patent No. 10-1288407

The above information disclosed in this Background section is provided only for enhancement of understanding of the background of the invention, and therefore it may include information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a solid oxide fuel cell including an anode (fuel electrode) having no interfacial defects and having a uniform packing structure, and a multi-layered electrolyte layer having a suppressed secondary phase at the interface and improved densification, and a method of manufacturing the same.

The aforementioned objects of the present invention, as well as other objects, will be clearly understood from the following description, and are capable of being implemented by means defined in the claims and combinations thereof.

In one aspect, the present invention provides a method of manufacturing a solid oxide fuel cell including preparing a stack including at least one anode support layer (ASL) and at least one anode functional layer (AFL), calendering the stack to obtain an anode, stacking at least one electrolyte layer on the anode to obtain an assembly, and calendering the assembly to obtain an electrolyte substrate, wherein the at least one electrolyte layer includes a sintering aid.

The anode support layer may include a sheet obtained by tape-casting a slurry containing at least one selected from the group consisting of nickel oxide (NiO), yttria-stabilized zirconia (YSZ) and a pore-forming agent.

The anode functional layer may include a sheet obtained by tape-casting a slurry including at least one selected from the group consisting of nickel oxide (NiO) and yttria-stabilized zirconia (YSZ).

The stack may include five to ten anode support layers including the anode support layer, and at least one anode functional layer disposed on the anode support layers.

The anode may be obtained by calendering the stack under the following conditions:
calendering rollers have a nip gap not less than 99% and less than 100% of a thickness of the stack;
the calendering rollers have a rotational speed of 0.3 rotations or fewer per minute;
the calendering rollers have a temperature of 60 to 90° C.; and
the calendering rollers have a diameter of 100 mm to 150 mm.

The anode may be obtained by calendering the stack at least two times.

The at least one electrolyte layer may be a bi-layered electrolyte layer.

The bi-layered electrolyte layer may include a first electrolyte layer containing a sintering aid and a second electrolyte layer not containing a sintering aid.

The first electrolyte layer may be interposed between the anode and the second electrolyte layer, and may include a sheet obtained by tape-casting a slurry containing at least one selected from the group consisting of nickel oxide (NiO), yttria-stabilized zirconia (YSZ) and a pore-forming agent.

The content of the sintering aid in the first electrolyte layer may be 1 to 5 mol % based on 100 mol % of the total of the first electrolyte layer.

The sintering aid may contain at least one selected from the group consisting of iron (Fe), copper (Cu), and cobalt (Co).

The second electrolyte layer may be disposed on the first electrolyte layer, and may include a sheet obtained by tape-casting a slurry containing gadolinium-doped ceria (GDC).

The electrolyte substrate may be obtained by calendering the assembly under the following conditions:
calendering rollers have a nip gap not less than 90% and less than 95% of a thickness of the assembly;
the calendering rollers have a rotational speed of 0.3 rotations or fewer per minute;
the calendering rollers have a temperature of 60 to 90° C.; and
the calendering rollers have a diameter of 100 mm to 150 mm.

The method may further include sintering the electrolyte substrate.

The electrolyte substrate may be sintered at 1,200 to 1,300° C.

The anode of the sintered electrolyte substrate may have a thickness of 0.6 mm to 1.0 mm, and the electrolyte layer may have a thickness of 5 μm to 20 μm.

The method may further include forming a cathode on the electrolyte layer of the electrolyte substrate.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
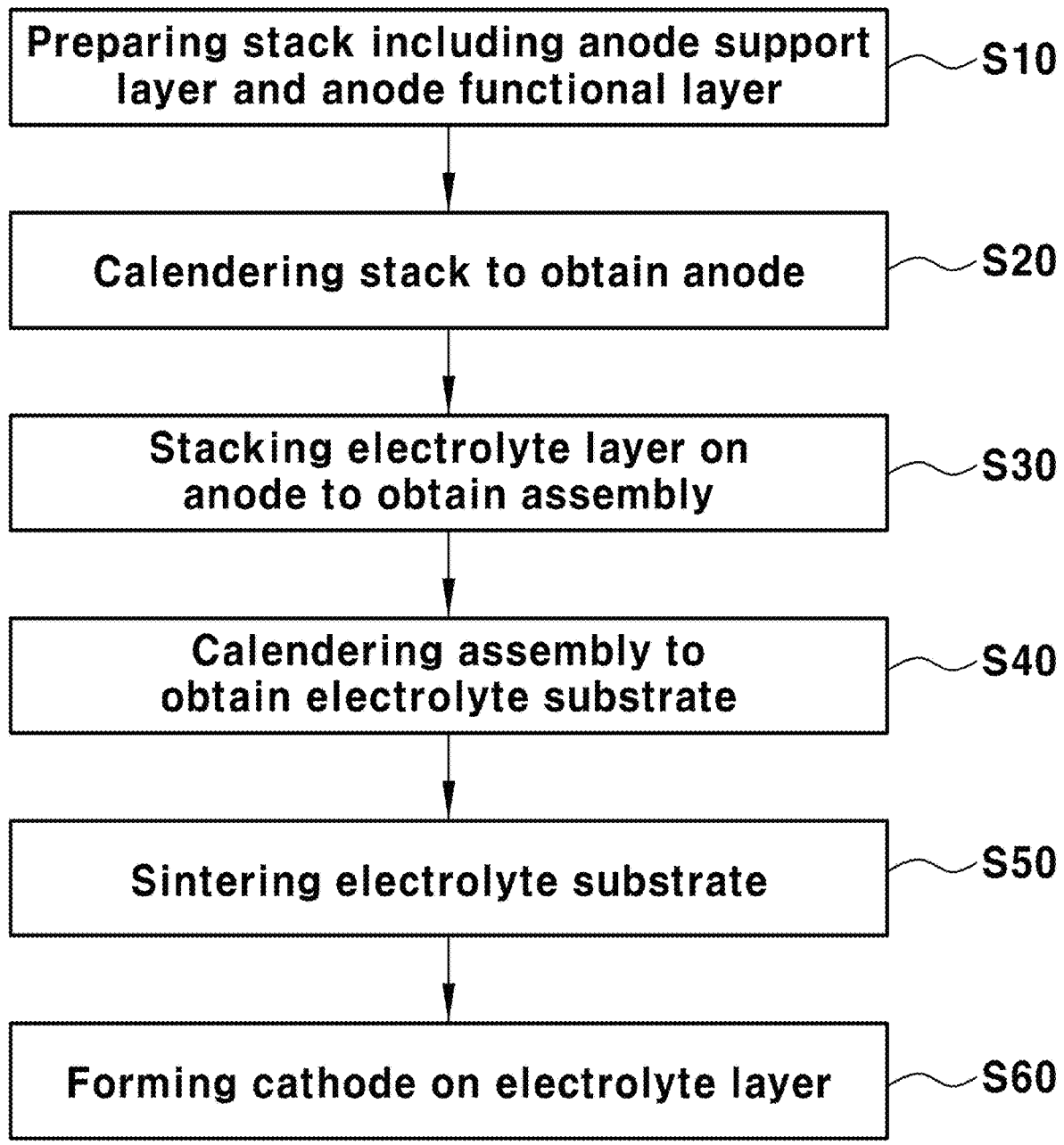
FIG. 1 is a flowchart illustrating a method of manufacturing a solid oxide fuel cell according to the present invention.

The objects described above, as well as other objects, features and advantages, will be clearly understood from the following preferred embodiments with reference to the attached drawings. However, the present invention is not limited to the embodiments, and will be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the term "comprises", "has", and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all the numbers, figures and/or expressions. In addition, when numerical ranges are disclosed in the description, these ranges are continuous and include all numbers from the minimum to the maximum including the maximum within the ranges unless otherwise defined. Furthermore, when the range refers to an integer, it includes all integers from the minimum to the maximum including the maximum within the range, unless otherwise defined.

FIG. 1 is a flowchart illustrating a method of manufacturing a solid oxide fuel cell according to the present invention. Referring thereto, the manufacturing method includes preparing a stack including an anode support layer (ASL) and an anode functional layer (AFL) (S10), calendering the stack to obtain an anode (S20), stacking at least one electrolyte layer on the anode to obtain an assembly (S30), calendering the assembly to obtain an electrolyte substrate (S40), sintering the electrolyte substrate (S50), and forming a cathode on the electrolyte layer of the electrolyte substrate (S60).

The technical feature of the present invention is to manufacture the anode and the electrolyte substrate through a calendering process. The calendering process includes passing a subject between a pair of calendering rollers to apply linear pressure to the subject. In this process, uniform linear pressure is continuously applied from one end of the subject to the other end thereof. Therefore, uniform stress is applied regardless of the width and length of the subject. Thus, unlike conventional uniaxial pressing processes, processing defects such as interfacial delamination between the respective components of the anode, the electrolyte substrate and the like and non-uniform packing density between positions are suppressed. In addition, since the packing density is increased, the sintering temperature for obtaining a dense electrolyte layer can be lowered.

The technical features of the present invention as described above will be understood in more detail from the description of respective steps below.

Figure 2:
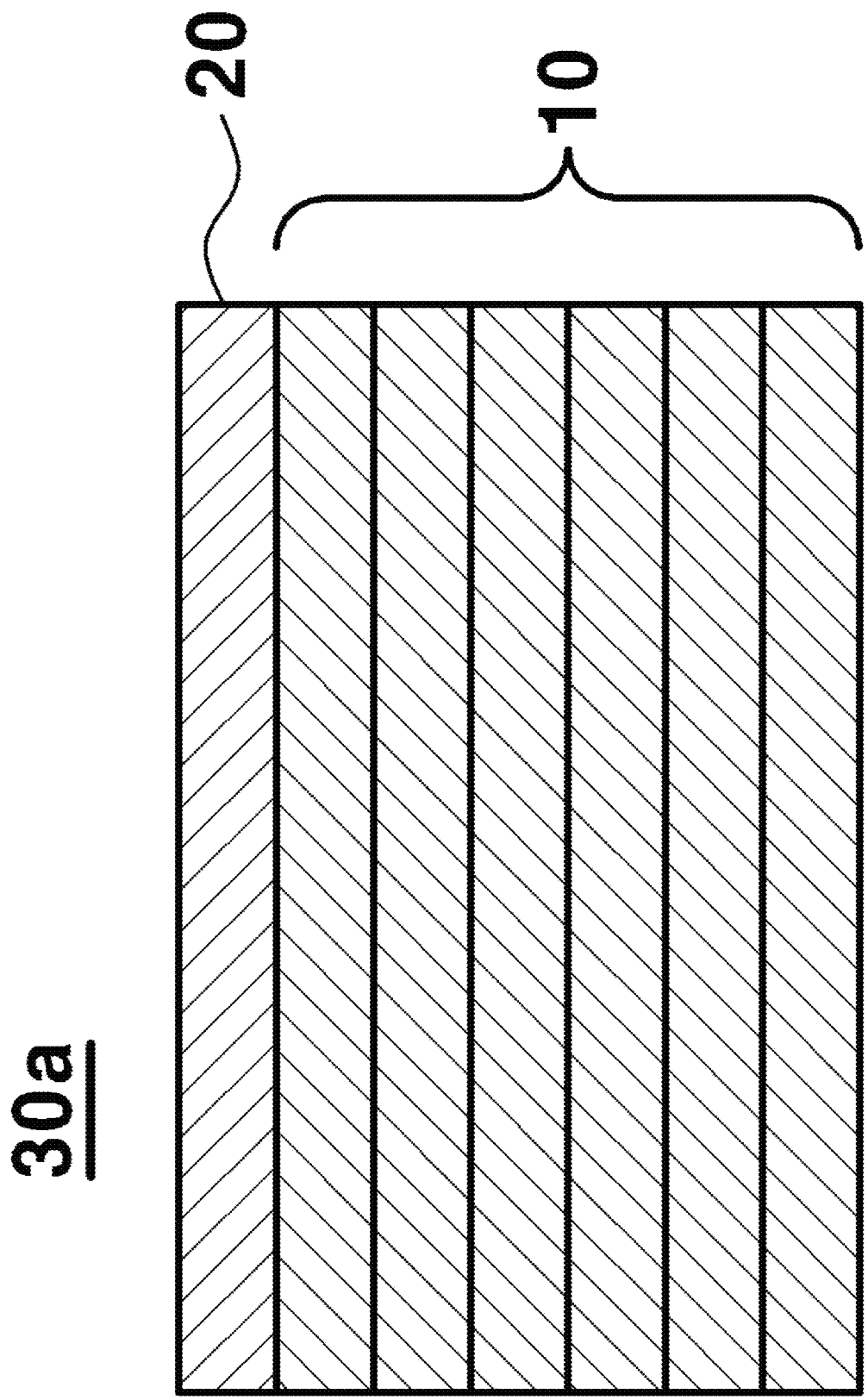
FIG. 2 is a schematic diagram showing a stack according to the present invention.

FIG. 2 schematically shows a stack 30a. Referring to FIG. 2, the stack 30a may include at least one anode support layer (ASL) 10 and at least one anode functional layer (AFL) 20. FIG. 2 shows a stack 30a including six anode support layers 10 and one anode functional layer 20 which are stacked, but the stack 30a according to the present invention is not limited thereto. The number of respective layers can be adjusted as desired.

The anode support layer 10 may include a sheet obtained by tape-casting a slurry containing at least one selected from the group consisting of nickel oxide (NiO), yttria-stabilized zirconia (YSZ) and a pore-forming agent. By stacking a plurality of sheets including the sheet, the anode support layer 10 shown in FIG. 2 can be obtained. The number of stacked layers constituting the sheet is not particularly limited, but the anode support layer 10 is preferably formed as five to ten layers in order to secure the mechanical strength of the anode 30b to be described later.

The pore-forming agent functions to form pores in the anode support layer, and the type thereof is not particularly limited. For example, the pore-forming agent may include polymethylmethacrylate (PMMA).

In addition, the slurry may contain a solvent selected from the group consisting of alcohol solvents such as methanol, ethanol, propanol and butanol, BTX solvents such as benzene, toluene and xylene, and combinations thereof.

In addition, the slurry may further contain at least one additive such as a binder for improving the binding force between respective components, a dispersant for improving dispersibility, or a plasticizer for improving workability.

The anode functional layer 20 may include a sheet obtained by tape-casting a slurry containing at least nickel oxide (NiO) and a pore-forming agent.

The slurry may include a solvent selected from the group consisting of alcohol solvents such as methanol, ethanol, propanol and butanol, BTX solvents such as benzene, toluene and xylene, and combinations thereof.

In addition, the slurry may further contain at least one additive such as a binder for improving the binding force between respective components, a dispersant for improving dispersibility, or a plasticizer for improving workability.

Figure 3:
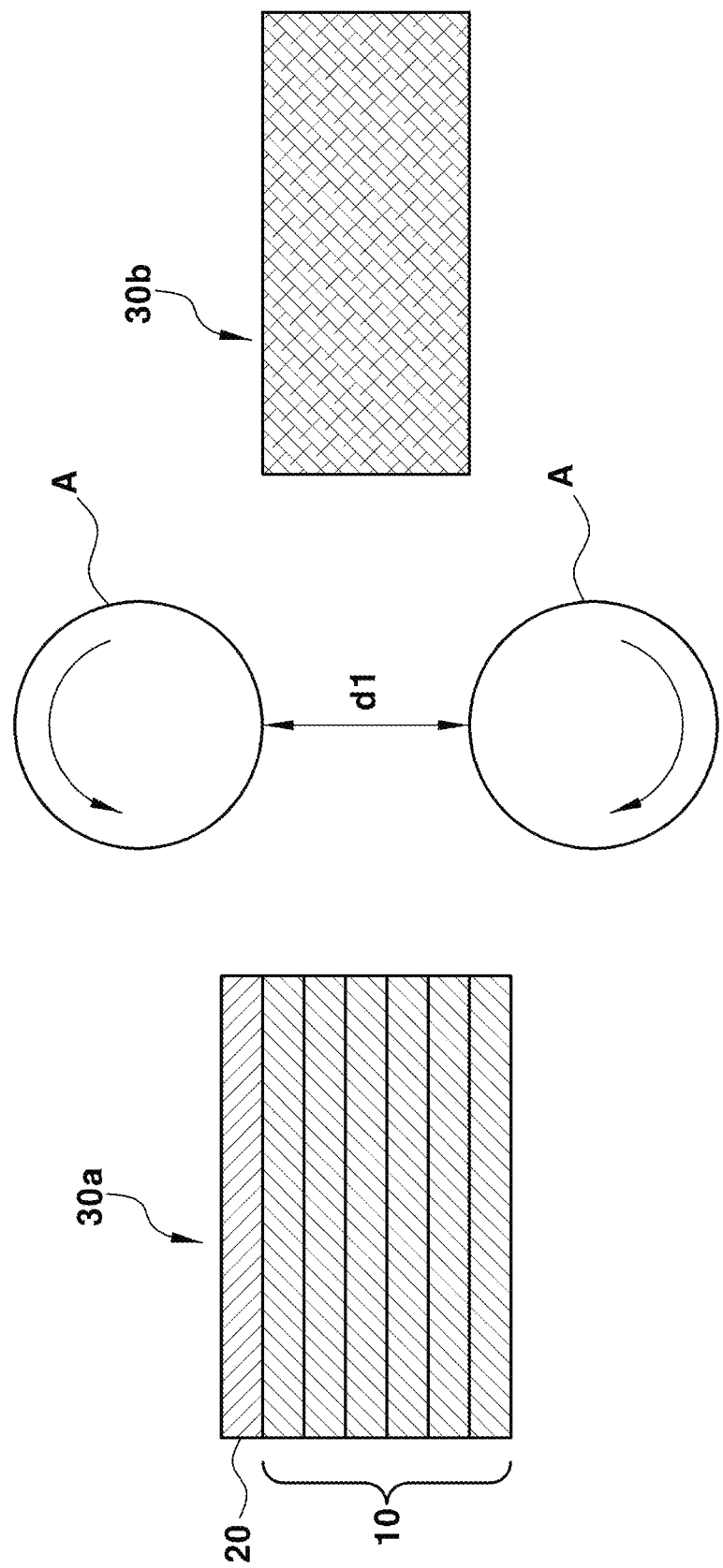
FIG. 3 is a schematic diagram showing calendering of the stack according to the present invention to obtain an anode.

FIG. 3 schematically illustrates calendering the stack 30a to obtain an anode 30b (S20). Referring thereto, the anode 30b can be obtained by passing the stack 30a through a pair of calendering rollers A to press the same.

Here, in order to remove the discontinuous interface between the respective sheets without physically destroying the stack 30a, the stack 30a should be calendered under specific conditions.

Specifically, the process of calendering the stack 30a is preferably carried out such that a nip gap d1 of the calendering roller A is within a range not less than 99% but less than 100% of the thickness of the stack 30a. When the nip gap is less than 99% of the thickness of the stack 30a, the stack 30a may be physically destroyed. Thus, it is preferable to calender the stack 30a under somewhat mild conditions.

In addition, the rotational speed of the calendering roller A is preferably 0.3 rotations per minute or less. When the rotational speed of the calendering roller A exceeds 0.3 rotations, the stack 30a may be damaged due to excessively fast rotation.

The temperature of the calendering roller A is preferably 60° C. to 90° C., and the diameter of the calendering roller A is preferably 100 mm to 150 mm. When the temperature and diameter fall within the above numerical ranges, it is possible to more effectively eliminate the discontinuous interface between the sheets.

The process of calendering the stack 30a may be performed at least two times. In this case, the calendering process may be performed while rotating the stack 30a by about 90°.

In addition, during calendering of the stack 30a, a protective layer may be stacked on at least one surface of the stack 30a to prevent damage to the stack 30a. The protective layer is not particularly limited, and may be a heat-resistant sheet such as a polyimide film. In the case of stacking the protective layer, the nip gap d1 of the calendering roller A is adjusted to a range of not less than 99% but less than 100% of the thickness of the stack 30a on which the protective layer is stacked. The protective layer may be removed after finishing the process of calendering the stack 30a.

Figure 4:
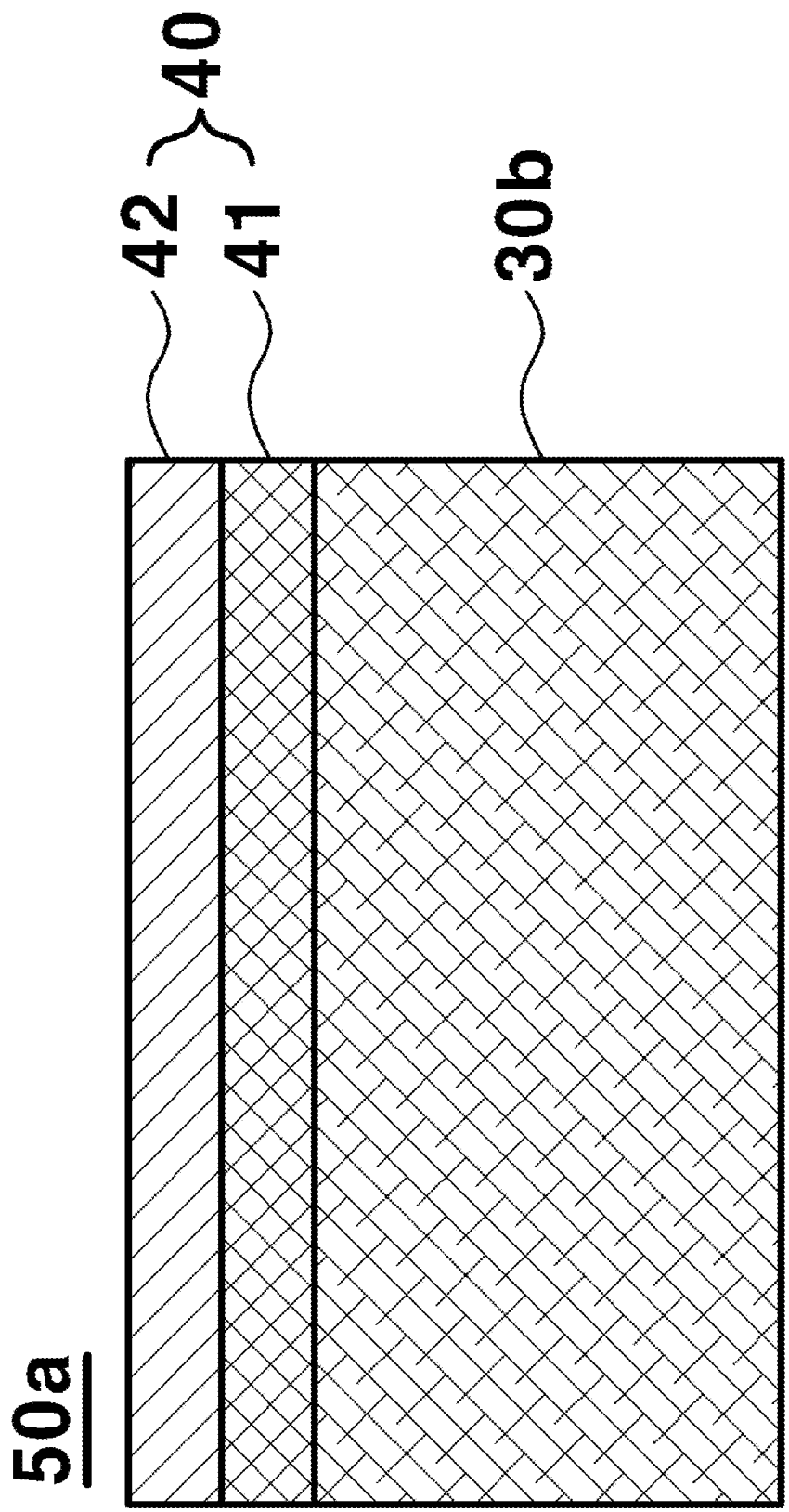
FIG. 4 is a schematic diagram showing an assembly according to the present invention.

FIG. 4 schematically shows the assembly 50a. Referring thereto, the assembly 50a can be obtained by stacking the at least one electrolyte layer 40 on the anode 30b. The number of electrolyte layers may be adjusted to an appropriate number as desired, but preferably, the electrolyte layer may be a bi-layered electrolyte layer 40 as shown in FIG. 4 (S30).

The bi-layered electrolyte layer 40 may include a first electrolyte layer disposed on the anode and a second electrolyte layer disposed on the first electrolyte layer.

The first electrolyte layer 41 is not particularly limited, as long as it has excellent ionic conductivity even in a reducing atmosphere and is thus able to suppress electronic conductivity that may occur in the second electrolyte layer 42 later.

Since the first electrolyte layer 41 is located between the anode and the second electrolyte layer 42, even if there is a difference in sintering shrinkage, the first electrolyte layer 41 preferably includes the same material as the anode to thereby provide excellent interfacial bonding with the anode without causing interfacial defects with the anode. More preferably, the first electrolyte layer 41 includes an appropriate amount of a sintering aid in order for the first electrolyte layer 41 to have sintering shrinkage behavior similar to that of the second electrolyte layer 42.

Thus, the first electrolyte layer 41 may include a sheet obtained by tape-casting a slurry containing at least one selected from the group consisting of yttria-stabilized zirconia (YSZ) and a sintering aid.

The sintering aid is not limited to any particular component, and may include a conventional sintering aid that can be used in the present invention, for example, at least one selected from the group consisting of iron (Fe), copper (Cu), and cobalt (Co). Preferably, the sintering aid may include iron (Fe), having a relatively small effect on the ionic conductivity of the first electrolyte layer.

The content of the sintering aid in the first electrolyte layer 41 may be 1 to 5 mol % based on 100 mol % of the total of the first electrolyte layer. When the content of the sintering aid is less than 1 mol %, it is difficult to sufficiently densify the first electrolyte layer, and when the content of the sintering aid exceeds 5 mol %, there is a disadvantage in which the first electrolyte layer is rapidly over-sintered during the sintering process, and thus the mechanical strength of interfacial bonding between the anode and the first electrolyte layer or between the first electrolyte layer and the second electrolyte layer may decrease.

The method of stacking the first electrolyte layer 41 is not particularly limited, and for example, the first electrolyte layer 41 may be transferred and stacked on the anode 30b.

The second electrolyte layer 42 is not particularly limited, as long as it exhibits high ionic conductivity in the intermediate temperature region, which is the fuel cell operating temperature, and has excellent chemical compatibility with the cathode, while not producing a high-resistance secondary phase due to a high-temperature chemical reaction.

The second electrolyte layer 42 is disposed on the first electrolyte layer, and may include a sheet obtained by tape-casting a slurry containing gadolinium-doped ceria (GDC).

The slurry may contain a solvent selected from the group consisting of alcohol solvents such as methanol, ethanol, propanol and butanol, BTX solvents such as benzene, toluene and xylene, and combinations thereof.

In addition, the slurry may further contain at least one additive such as a binder for improving the binding force of each component, a dispersant for improving dispersibility, or a plasticizer for improving workability.

The method of stacking the second electrolyte layer 42 on the first electrolyte layer 41 is not particularly limited, and for example, the second electrolyte layer 42 may be stacked on the first electrolyte layer 41 by transferring the second electrolyte layer 42 thereto.

That is, the electrolyte layer according to an embodiment of the present invention is a bi-layered electrolyte layer having the characteristics described above, so the sintering aid can diffuse into the second electrolyte layer 42 during the sintering process, thereby improving the sintering characteristics and enabling formation of a dense second electrolyte layer even at a lower sintering temperature than the high sintering temperature used in the conventional manufacture thereof.

Figure 5:
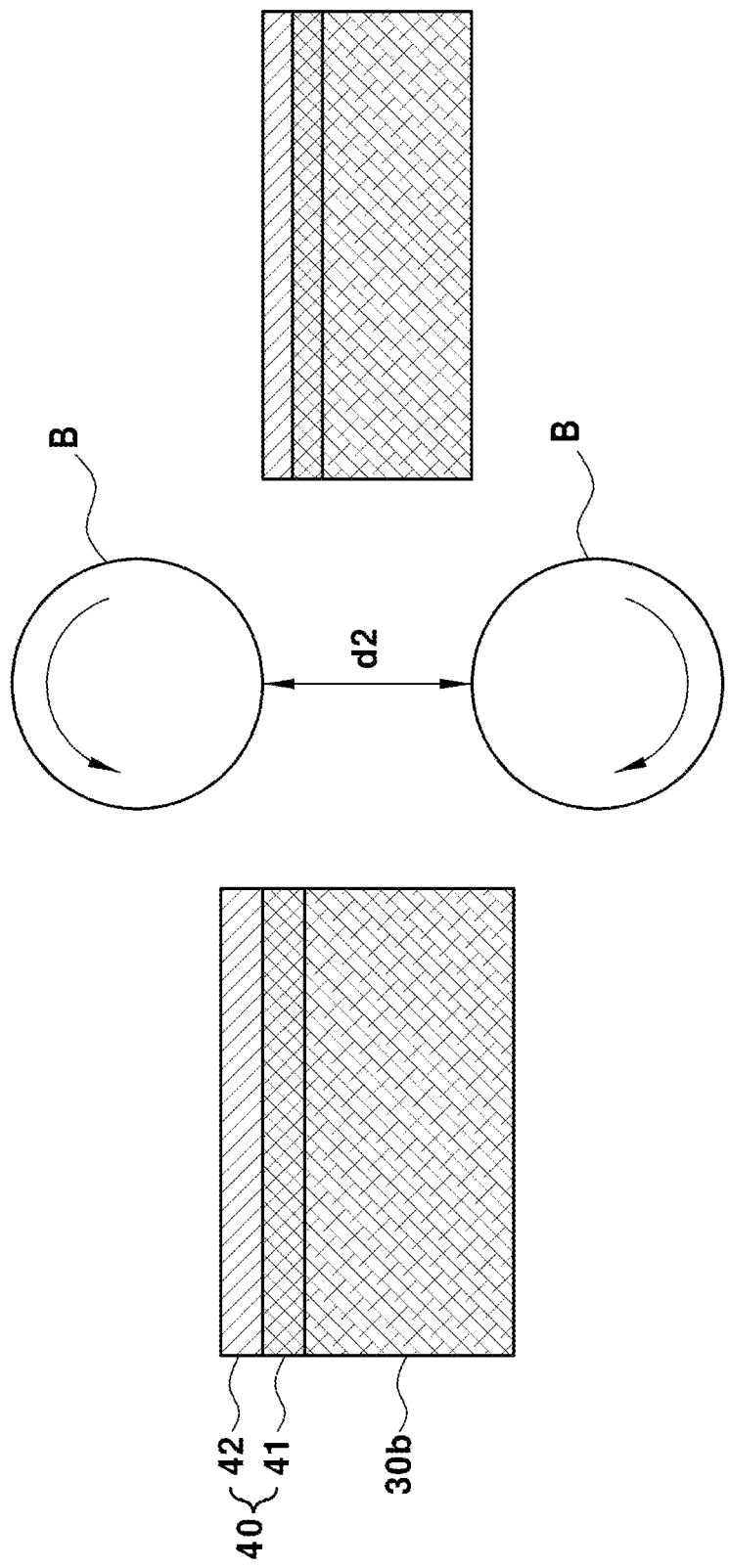
FIG. 5 is a schematic diagram showing calendering the assembly according to the present invention to obtain an electrolyte substrate.

FIG. 5 schematically shows calendering the assembly 50a to obtain an electrolyte substrate 50b (S40). Referring thereto, the electrolyte substrate 50b can be obtained by pressing the assembly 50a while passing the assembly 50a through a pair of calendering rollers B.

In order to improve the packing density while increasing the interfacial bonding force by inducing the mutual penetration through the substance movement between the one or more electrolyte layers 40, the calendering of the assembly 50a is preferably performed under stronger conditions than the calendering of the stack 30a to increase shear stress.

Specifically, the process of calendering the assembly 50a may be performed under the condition that the nip gap do of the calendering roller B is within a range of 90% to 95% of the thickness of the assembly 50a. When the nip gap is less than 90% of the thickness of the assembly 50a, the applied linear pressure may be too strong, causing damage to the assembly 50a. On the other hand, when the applied linear pressure exceeds 95%, it may be difficult to improve the interface characteristics between the anode 30b and the at least one electrolyte layer 40 and the packing density of the at least one electrolyte layer 40 to a desired level.

In addition, the rotational speed of the calendering roller B is preferably at least 0.3 rotations per minute. When the rotational speed exceeds 0.3 rotations, the stacked body 30b may be damaged due to the excessively fast rate.

The temperature of the calendering roller B is preferably 60° C. to 90° C., and the diameter of the calendering roller is preferably 100 mm to 150 mm. When the temperature and diameter fall within the above numerical ranges, the discontinuous interface between the anode 30b and the at least one electrolyte layer 40 can be more effectively removed.

Then, the electrolyte substrate 50b may be sintered (S50). According to the present invention, the interfacial discontinuity between the sheets included in the electrolyte substrate 50b is removed through the above-described calendering process, and the packing density of the electrolyte layer 40 is greatly improved. Therefore, it is not necessary to set the sintering temperature for the electrolyte substrate 50b to a high temperature, as in conventional cases. The reason for this is that, even when sintered at a lower temperature, a structure having a density the same as or greater than that of conventional cases can be obtained.

Specifically, the electrolyte substrate 50b may be sintered at 1,200° C. to 1,300° C. For reference, "sintering temperature" refers to the highest temperature during the sintering process. Since the sintering temperature is lowered, processing costs can be reduced, and a reduction in the size of the reaction area can be prevented due to excessive sintering on nickel oxide (NiO) and the yttria-stabilized zirconia (YSZ) constituting the anode 30b.

The thickness of the anode of the electrolyte substrate 50b may be 0.6 mm to 1.0 mm, and the thickness of the electrolyte layer may be 5 μm to 20 μm. However, the thickness of each component can be adjusted as desired, and the thickness of the above-described sheet and the like can be changed according to the adjusted value.

Figure 6:
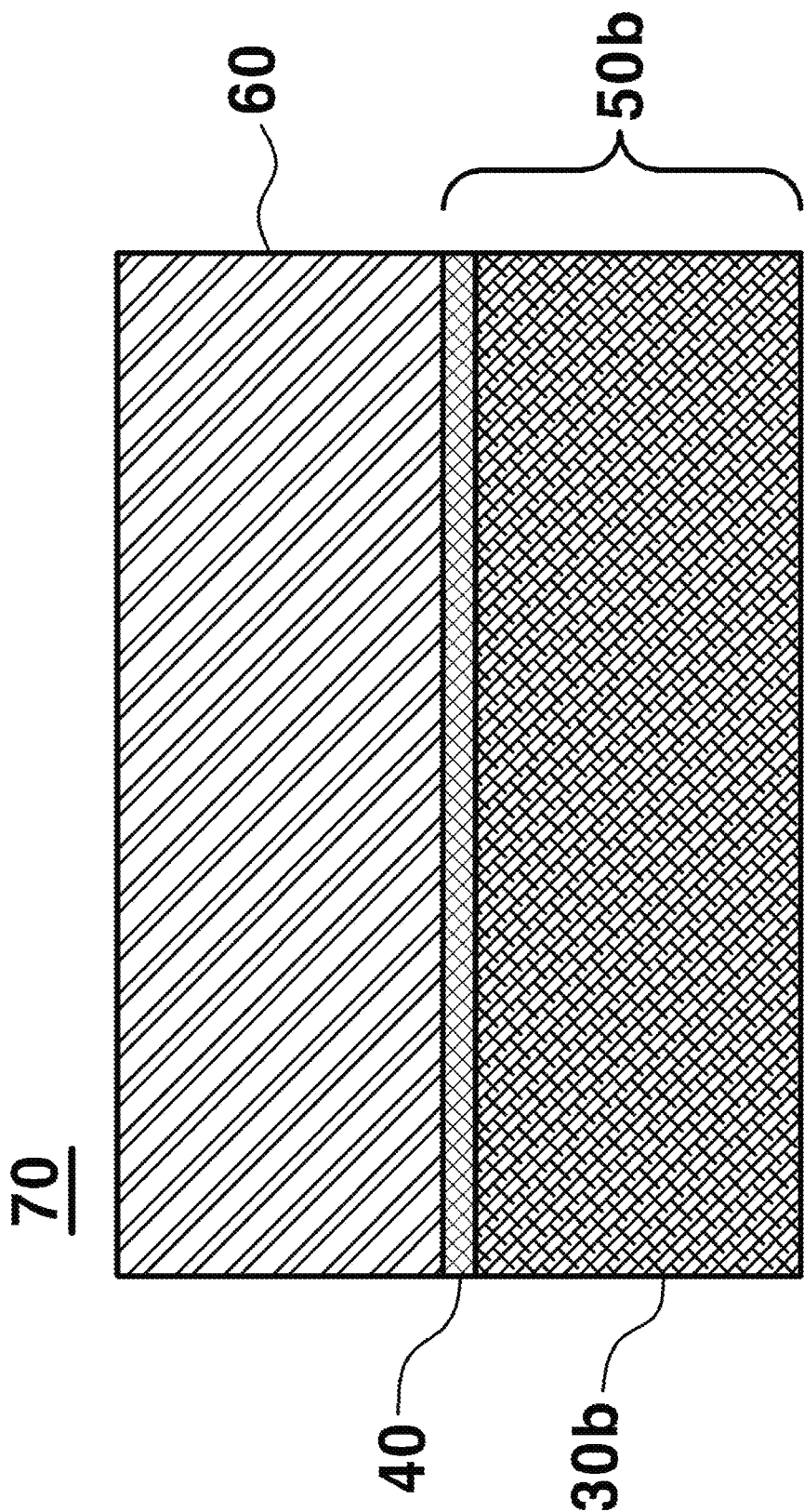
FIG. 6 shows a solid oxide fuel cell, obtained by forming a cathode on the electrolyte layer of the electrolyte substrate according to the present invention.

FIG. 6 shows a solid oxide fuel cell 70, obtained by forming a cathode 60 on the at least one electrolyte layer 40 of the electrolyte substrate 50b (S60). The cathode 60 may be typical in the art to which the present invention pertains with regard to the material, thickness, etc. thereof. For example, the cathode 60 includes a cathode functional layer (not shown) including $La_{0.6}Sr_{0.4}Co_{0.2}Fe_{0.8}O_{3-d}$ (LSCF) and gadolinium-doped ceria (GDC), and a cathode support layer (not shown) including $La_{0.6}Sr_{0.4}Co_{0.2}Fe_{0.8}O_{3-d}$ (LSCF).

The method of forming the cathode 60 is not particularly limited, and the cathode 60 may be formed by, for example, applying a material therefor to the electrolyte layer 40 by screen printing.

Hereinafter, the present invention will be described in more detail with reference to specific examples. However, these examples are provided only for better understanding of the present invention and should not be construed as limiting the scope of the present invention.

Preparation Example 1—Preparation of Anode Support Layer

Nickel oxide (NiO), yttria-stabilized zirconia (YSZ) and polymethylmethacrylate (PMMA) were mixed at a volume ratio of 28:42:30 to obtain a powder. The powder and a solvent were mixed at a volume ratio of 24:76 to obtain a slurry. In this case, a mixed solvent containing ethanol and toluene was used as the solvent.

2.3 parts by weight of a polyester/polyamine condensation polymer (Hypermer KD-1, ICI chemical Co., Spain) as a dispersant, 9.3 parts by weight of poly(vinyl butyral) (PVB) as a binder, and 9.3 parts by weight of dibutyl phthalate as a plasticizer were added to 100 parts by weight of the slurry. The slurry was ball-milled for about 24 hours and then aged for about 24 hours.

The slurry was tape-cast to obtain an anode support layer sheet.

Preparation Example 2—Preparation of Anode Functional Layer

Nickel oxide (NiO) and yttria-stabilized zirconia (YSZ) were mixed at a volume ratio of 40:60 to obtain a powder. The powder and a solvent were mixed at a volume ratio of 24:76 to obtain a slurry. In this case, a mixed solvent containing ethanol and toluene was used as the solvent.

2.47 parts by weight of a polyester/polyamine condensation polymer ("Hypermer" KD-1) as a dispersant, 9.2 parts by weight of poly(vinyl butyral) (PVB) as a binder, and 8.49 parts by weight of dibutyl phthalate as a plasticizer were added to 100 parts by weight of the slurry. The slurry was ball-milled for about 24 hours and then aged for about 24 hours.

The slurry was tape-cast to obtain an anode functional layer sheet.

Preparation Example 3—Preparation of First Electrolyte Layer

An Fe-yttria-stabilized zirconia (Fe-YSZ) powder coated on the surface of 2 mol % of iron (Fe) based on 100 mol % of the total of the first electrolyte layer (Fe-YSZ electrolyte) and a solvent were mixed at a volume ratio of 7:93 to obtain a slurry. A mixed solvent containing ethanol and toluene was used as the solvent.

2.5 parts by weight of a polyester/polyamine condensation polymer ("Hypermer" KD-6) as a dispersant, 8.5 parts by weight of poly(vinyl butyral) (PVB) as a binder, and 10.5 parts by weight of dibutyl phthalate as a plasticizer were added to 100 parts by weight of the slurry. The slurry was ball-milled for about 24 hours and then aged for about 24 hours.

The slurry was tape-cast to obtain a first electrolyte layer sheet (Fe-YSZ electrolyte).

Preparation Example 4—Preparation of Second Electrolyte Layer

A gadolinium-doped ceria (GDC) powder having a small specific surface area and a solvent were mixed at a volume ratio of 7:93 to obtain a slurry. A mixed solvent containing ethanol and toluene was used as the solvent.

3 parts by weight of a polyester/polyamine condensation polymer ("Hypermer" KD-6) as a dispersant, 10.5 parts by weight of poly(vinyl butyral) (PVB) as a binder, and 10.5 parts by weight of dibutyl phthalate as a plasticizer were added to 100 parts by weight of the slurry. The slurry was ball-milled for about 24 hours and then aged for about 24 hours.

The slurry was tape-cast to obtain a second electrolyte layer sheet (LSA-GDC electrolyte).

Example

First, an anode was produced as follows.

Six anode support layer sheets obtained in Preparation Example 1 and one anode functional layer sheet obtained in Preparation Example 2 were stacked to obtain a stack. The stack was pressed with calendering equipment to produce an anode. The calendering equipment was set such that the nip gap of the calendering roller was adjusted to 99% of the stack thickness and the rotational speed was adjusted to 0.21 to 0.32 rotations per minute. The calendering roller used herein had a temperature of 75° C. and a diameter of 120 mm. The stack was pressed once using the calendering equipment.

Then, one sheet of the first electrolyte layer (Fe-YSZ electrolyte) of Preparation Example 3 was stacked on the anode and pressed with calendering equipment, and then one sheet of the second electrolyte layer (LSA-GDC electrolyte)

of Preparation Example 4 was pressed with calendering equipment. The calendering equipment was set such that the nip gap of the calendering roller was adjusted to 99% of the total sheet thickness and the rotational speed was adjusted to 0.21 to 0.32 rotations per minute. The calendering roller used herein had a temperature of 75° C. and a diameter of 120 mm.

Then, one sheet of the first electrolyte layer (Fe-YSZ electrolyte) of Preparation Example 3 was stacked on the anode, followed by pressing with calendering equipment, and then one sheet of the second electrolyte layer (LSA-GDC electrolyte) of Preparation Example 4 was pressed with calendering equipment. The calendering equipment set the nip gap of the calendering roller to 99% of the total sheet thickness, and the rotation speed was maintained at 0.21 to 0.32 rotations per minute. The calendering roller used herein had a temperature of 75° C. and a diameter of 120 mm.

Then, all of the electrolyte layers (YSZ & GDC) were stacked on the anode, the calendering equipment set the nip gap of the calendering roller to 92% of the total sheet thickness and the rotation speed was changed to 0.21 to 0.32 rotations per minute. Then, a rolled sheet was placed between the polyimide films and then strongly pressed.

The rolled sheet was sintered using an electric furnace. The sintering schedules are shown in Table 1 below. The sintering temperature was set to 1,250° C. or lower, which is lower than that of a conventional case.

A cathode was formed on the electrolyte layer of the sintered substrate by screen printing. Specifically, a cathode functional layer was formed by screen-printing a composition containing $La_{0.6}Sr_{0.4}Co_{0.2}Fe_{0.8}O_{3-d}$ (LSCF) and gadolinium-doped ceria (GDC) three times, and a cathode support layer was formed by screen-printing a composition containing $La_{0.6}Sr_{0.4}Co_{0.2}Fe_{0.8}O_{3-d}$ (LSCF) three times. Upon each so application, planarization was performed at room temperature for 30 minutes, and then drying was performed at 60° C. for about 1 hour and 80° C. for about 1 hour. Then, sintering was performed in accordance with the sintering schedule shown in Table 2 below to obtain a solid oxide fuel cell.

TABLE 1

| Starting temperature | Heating time | Heating rate | Retention time |
|---|---|---|---|
| 30–200° C. | 2 h | 1.42° C./min | 1 h |
| 200–300° C. | 2 h 30 min | 0.67° C./min | 2 h 30 min |
| 300–450° C. | 2 h 30 min | 1° C./min | 2 h 30 min |
| 450–600° C. | 2 h | 1.25° C./min | 2 h |
| 600–950° C. | 2 h 30 min | 2.33° C./min | 0 |
| 950–1250° C. | 1 h 40 min | 3° C./min | 4 h |
| 1250–900° C. | 3 h 30 min | 1.67° C./min | 0 |
| 900–600° C. | 5 h | 1° C./min | 0 |
| 600–20° C. | 4 h 30 min | 2.15° C./min | 0 |

TABLE 2

| Starting temperature | Heating time | Heating rate | Retention time |
|---|---|---|---|
| 30–170° C. | 1 h 40 min | 1.4° C./min | 1 h |
| 170–350° C. | 2 h | 1.5° C./min | 2 h |
| 350–400° C. | 30 min | 1.67° C./min | 2 h |
| 400–1050° C. | 3 h | 3.61° C./min | 3 h |
| 1050–20° C. | 4 h | 4.29° C./min | 0 h |

Comparative Example—Manufacture of Solid Oxide Fuel Cell without Sintering Aid

A solid oxide fuel cell was manufactured in the same manner as in Example, except that the sintering aid was not included in the second electrolyte layer, in contrast with Example.

Experimental Example 1—Microstructure of Electrolyte Substrate

For the electrolyte substrate (anode-electrolyte layer (bilayer)) produced in Example above, microstructure analysis was performed on the surface of the second electrolyte layer and on the cross section of the electrolyte substrate through a scanning electron microscope (SEM). In particular, for the electrolyte substrate analysis, sampling was performed using an Ar ion milling system (IMS), and then the microstructure was quantitatively analyzed. The result of surface analysis of the second electrolyte layer is shown in FIG. 7A and the result of the cross-section analysis of the electrolyte substrate is shown in FIG. 7B.

Figure 7A:
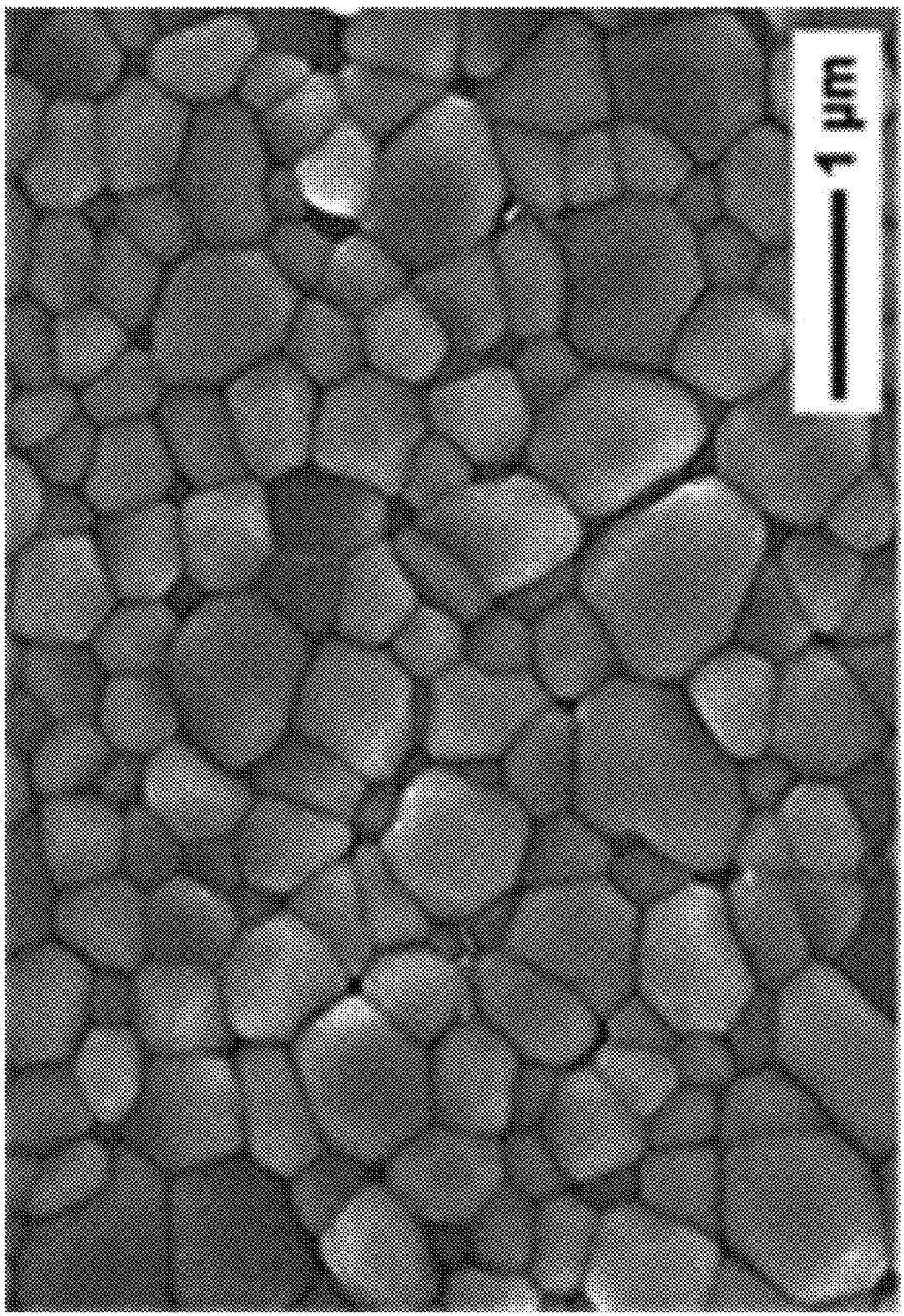
FIG. 7A is a scanning electron microscope (SEM) image showing the surface of a second electrolyte layer in the electrolyte substrate (anode-electrolyte layer (bi-layer)) manufactured according to Example of the present invention.
Figure 7B:
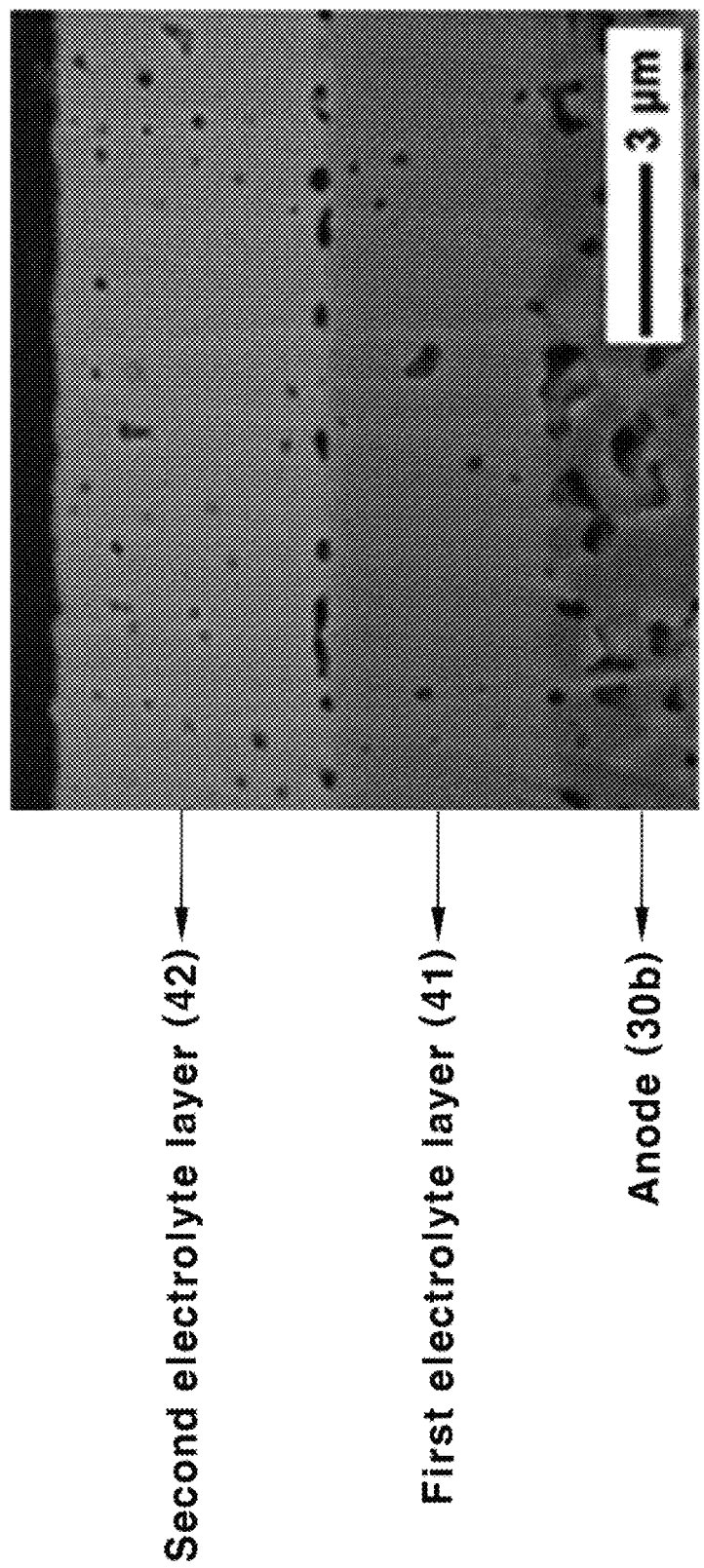
FIG. 7B is a scanning electron microscope (SEM) image showing the cross section of the electrolyte substrate.

It can be seen from FIGS. 7A and 7B that the relative density of each of the first electrolyte layer and the second electrolyte layer is about 98% or more. In addition, it can be seen that the degree of bonding at the interface between the electrolytes, that is, the interface between the first electrolyte layer and the second electrolyte layer, is about 70% or more.

This indicates that, only when shear stress is applied by the calendering process, as in the present invention, the packing density before sintering can be improved, relatively large pores can be removed, and the sintering temperature can be effectively lowered.

Figure 8A:
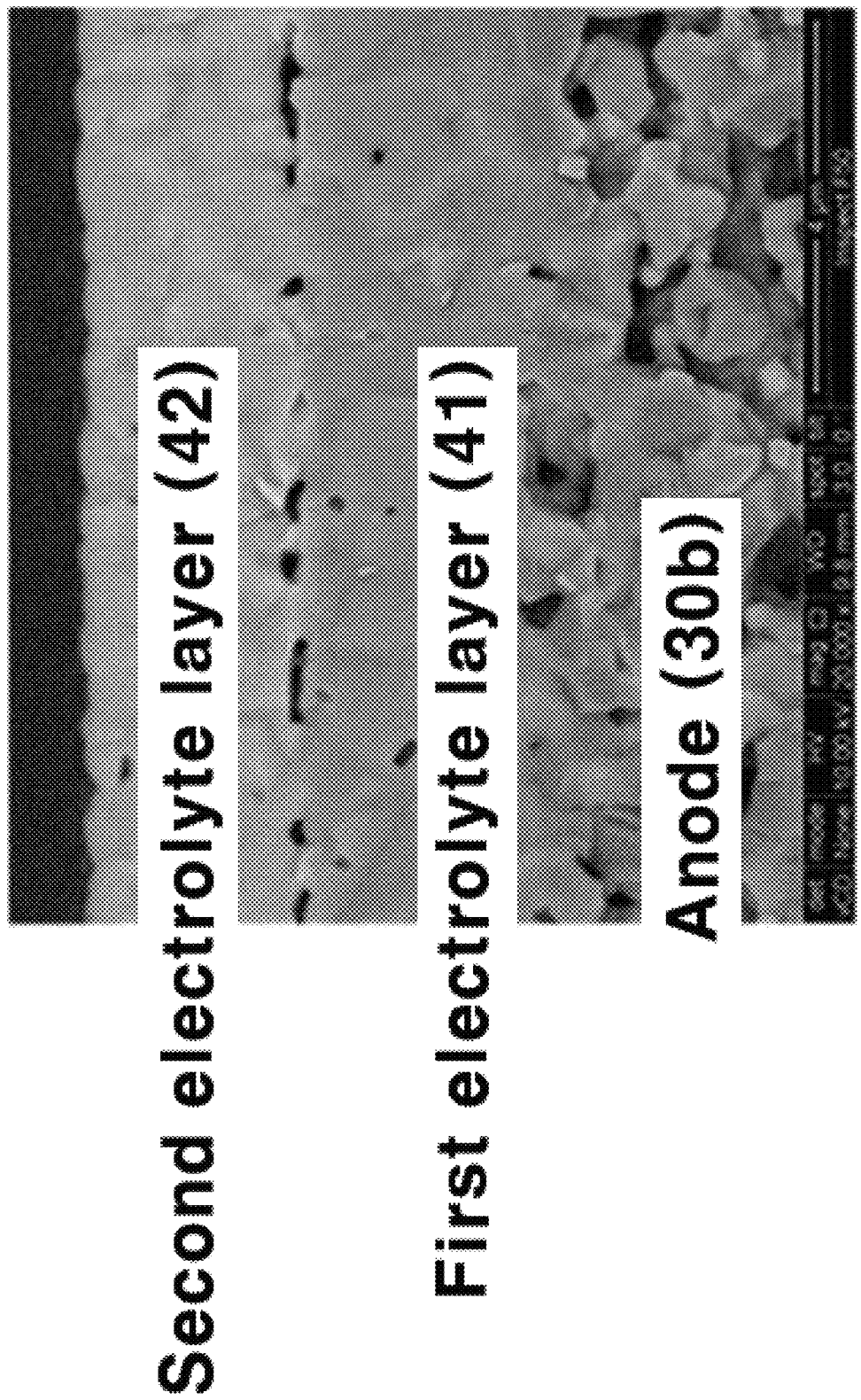
FIG. 8A is a scanning electron microscope (SEM) image showing the surface of the electrolyte substrate (anode-electrolyte layer (bi-layer)) manufactured according to Example of the present invention.
Figure 8B:
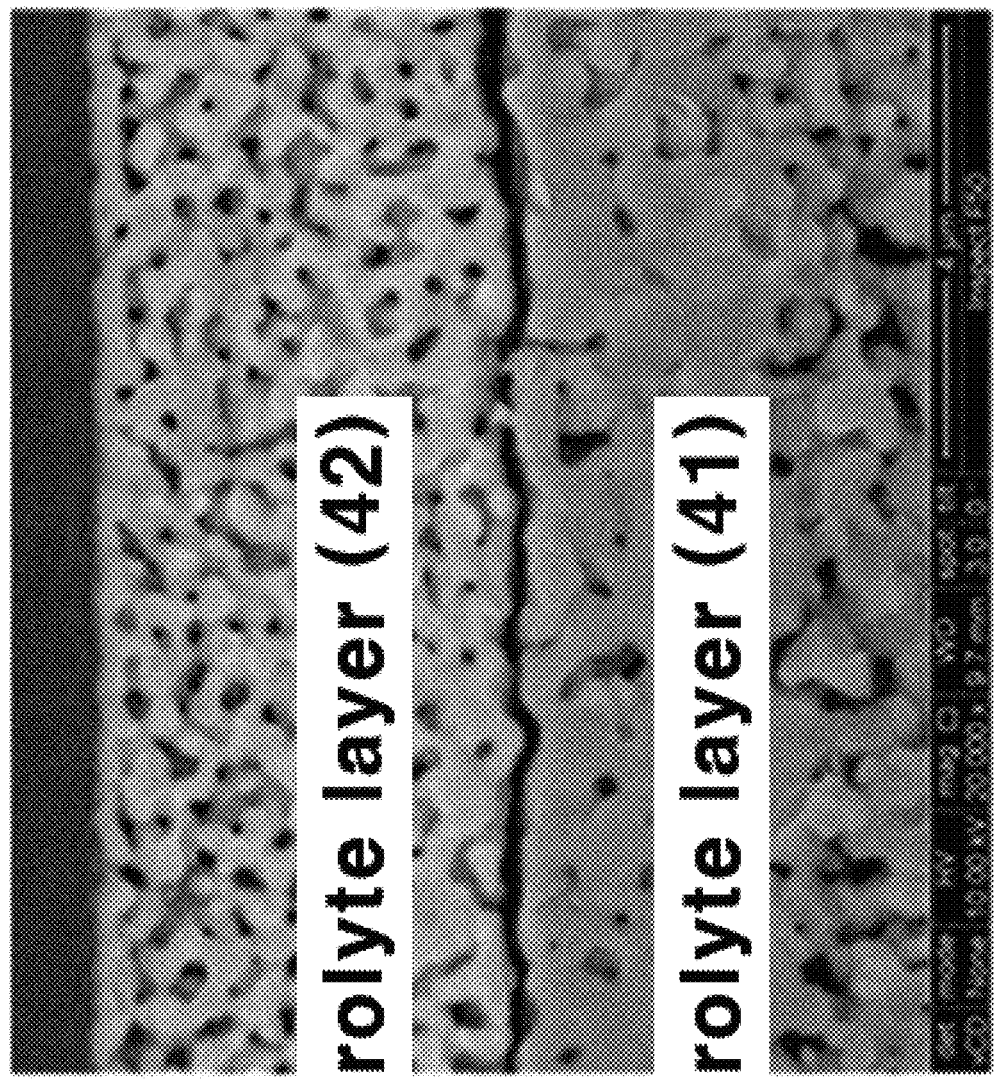
FIG. 8B is a scanning electron microscope (SEM) image showing the cross section of the electrolyte substrate (anode-electrolyte layer (bi-layer)) manufactured according to Comparative Example.
Figure 8C:
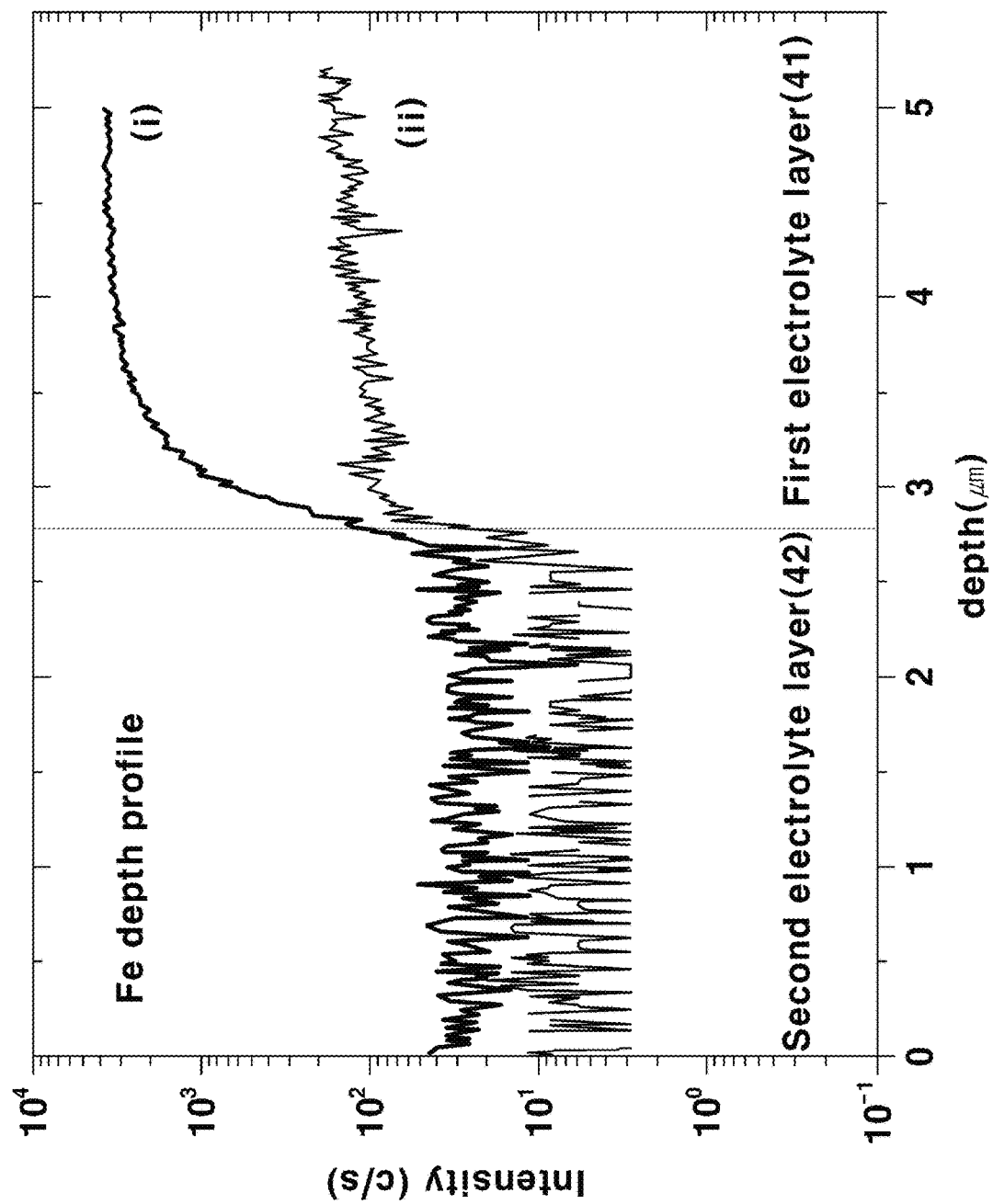
FIG. 8C is a graph showing the distribution of iron (Fe) as a sintering aid through dynamic secondary ion mass spectrometry (D-SIMS) analysis based on the SEM observed according to FIGS. 8A and 9B.

Experimental Example 2—Relative Presence of Sintering Aid in First Electrolyte Layer and Second Electrolyte Layer For the electrolyte substrate (anode-electrolyte layer (bilayer)) produced in Examples and Comparative Examples above, the presence of iron (Fe), that is, the relative intensity of iron (Fe), as a sintering aid from the surface of the second electrolyte layer to the surface contacting the anode of the second electrolyte layer was determined through a dynamic secondary ion mass spectrometry (D-SIMS) analysis method, and the results are shown in FIGS. 8A to 8C.

As can be seen from FIGS. 8A and 8B above, in Comparative Example, in which the sintering aid was not added to the first electrolyte layer, interfacial defects occurred, even when calendering was performed, due to difference in the sintering shrinkage behavior between the first electrolyte layer and the second electrolyte layer, unlike Example, in which the sintering aid was added thereto.

In addition, as can be seen from FIG. 8C, iron (Fe), which was a sintering aid present only in the first electrolyte layer before sintering, was also observed in the second electrolyte layer.

This proves that the sintering aid diffuses into the second electrolyte layer during the sintering process in the method of manufacturing a solid oxide fuel cell using the first electrolyte layer and the second electrolyte layer produced according to an embodiment of the present invention. The sintering characteristics can be improved due to the above characteristics, and a dense second electrolyte layer can be formed even at a low sintering temperature, rather than the high sintering temperature conventionally used in manufacturing.

Figure 9:
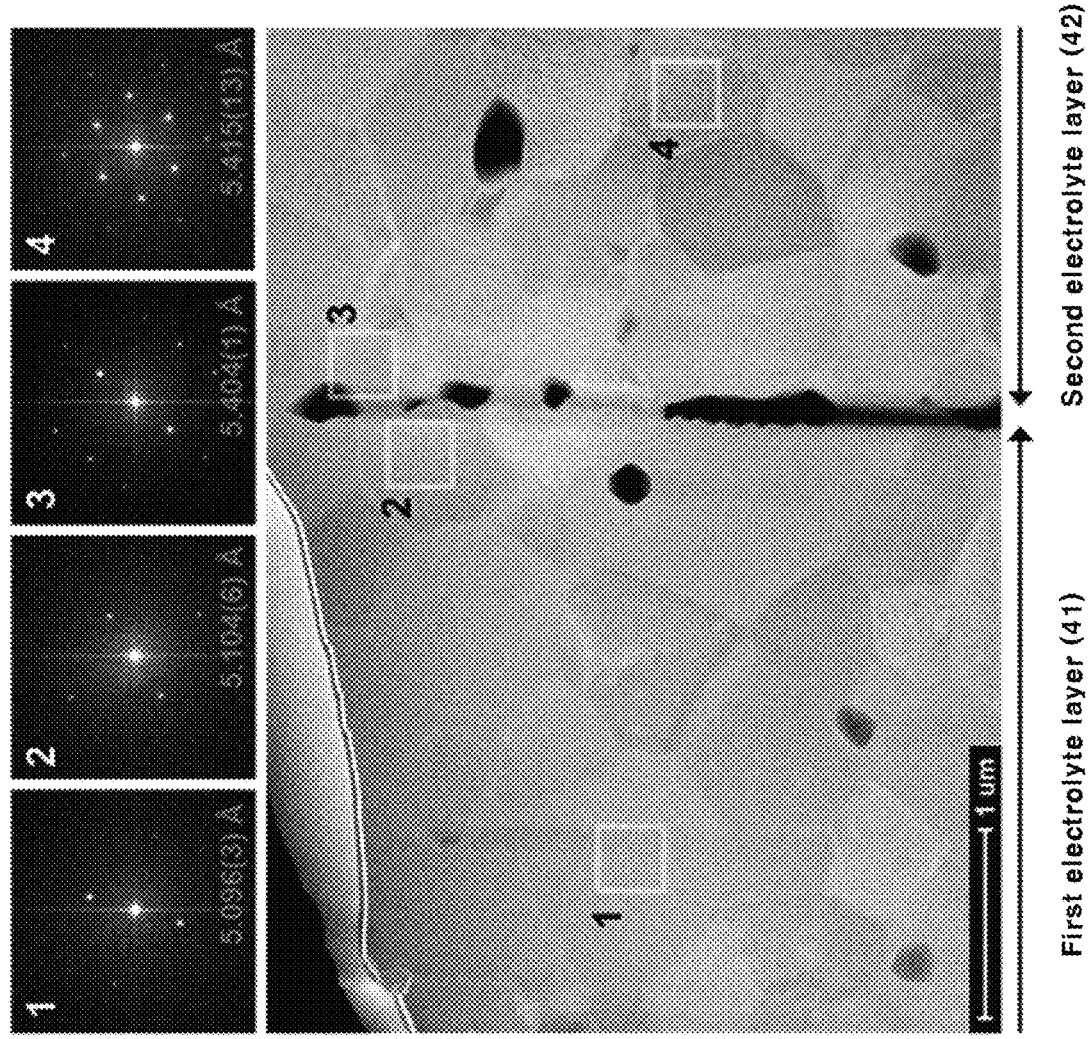
FIG. 9 is a TEM (transmission electron microscopy) image showing a cross-sectional structure of a bi-layered electrolyte in the electrolyte substrate (anode-electrolyte layer (bi-layer)) manufactured according to Example of the present invention, and an image showing SAED (selected area diffraction) patterns of display areas (squares 1 to 4)

Example 3—Determination as to Whether Secondary Phase is Suppressed at Interface Between First Electrolyte Layer and Second Electrolyte Layer FIG. 9 shows the result of observing the cross-sectional structure of the bi-layered electrolyte in the electrolyte substrate (anode-electrolyte layer (bi-layer)) produced in Example above.

Then, the lattice constant was calculated through the SAED (selected area diffraction) pattern of an interfacial region between the first and second electrolyte layers and a region spaced away from the interfacial region using the cross-sectional structure of the bi-layered electrolyte shown in FIG. 9.

The result showed that the lattice constant of the first electrolyte layer and the second electrolyte layer in the interfacial region coincides with the lattice constant of the first electrolyte layer and the second electrolyte layer in the region spaced apart from the interfacial region within an error range.

That is, the above results showed that the method of manufacturing the solid oxide fuel cell according to Example is capable of suppressing the formation of a secondary phase through a high-temperature chemical reaction and of improving the dense structure of the finally produced bi-layered electrolyte by simultaneously sintering the first electrolyte layer and the second electrolyte layer at a temperature (1,250° C.) lower than the electrolyte sintering temperature which is commonly used for SOFC. As a result, the solid oxide fuel cell manufactured according to Example has an advantage of exhibiting excellent output characteristics and long-term stability even at an intermediate operating temperature.

Figure 10A:
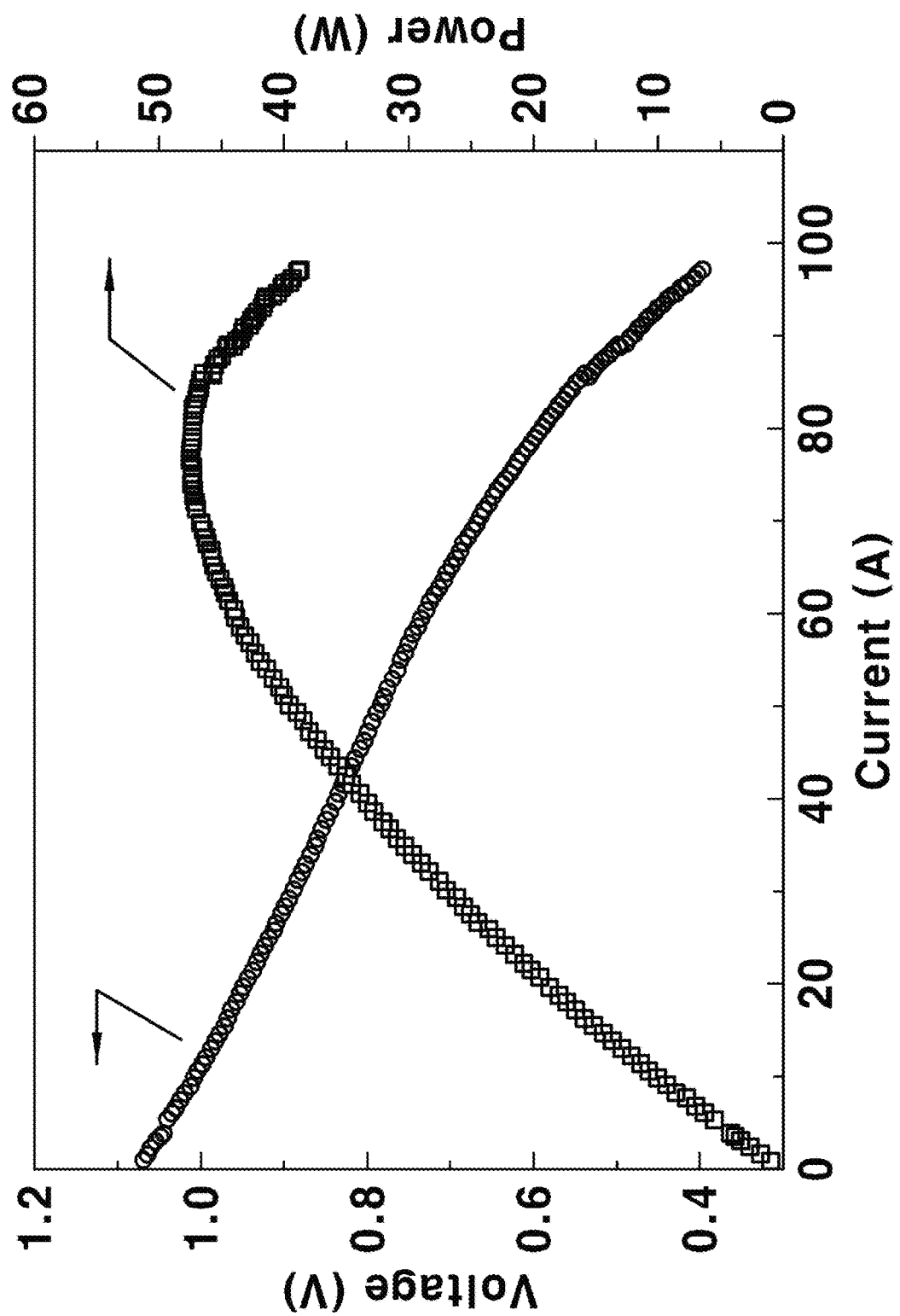
FIG. 10A is a graph showing the result of current-voltage-power performance evaluation at a temperature of 700° C. and a constant current of 0.3 A/cm² of the solid oxide fuel cell manufactured according to Example of the present invention.
Figure 10B:
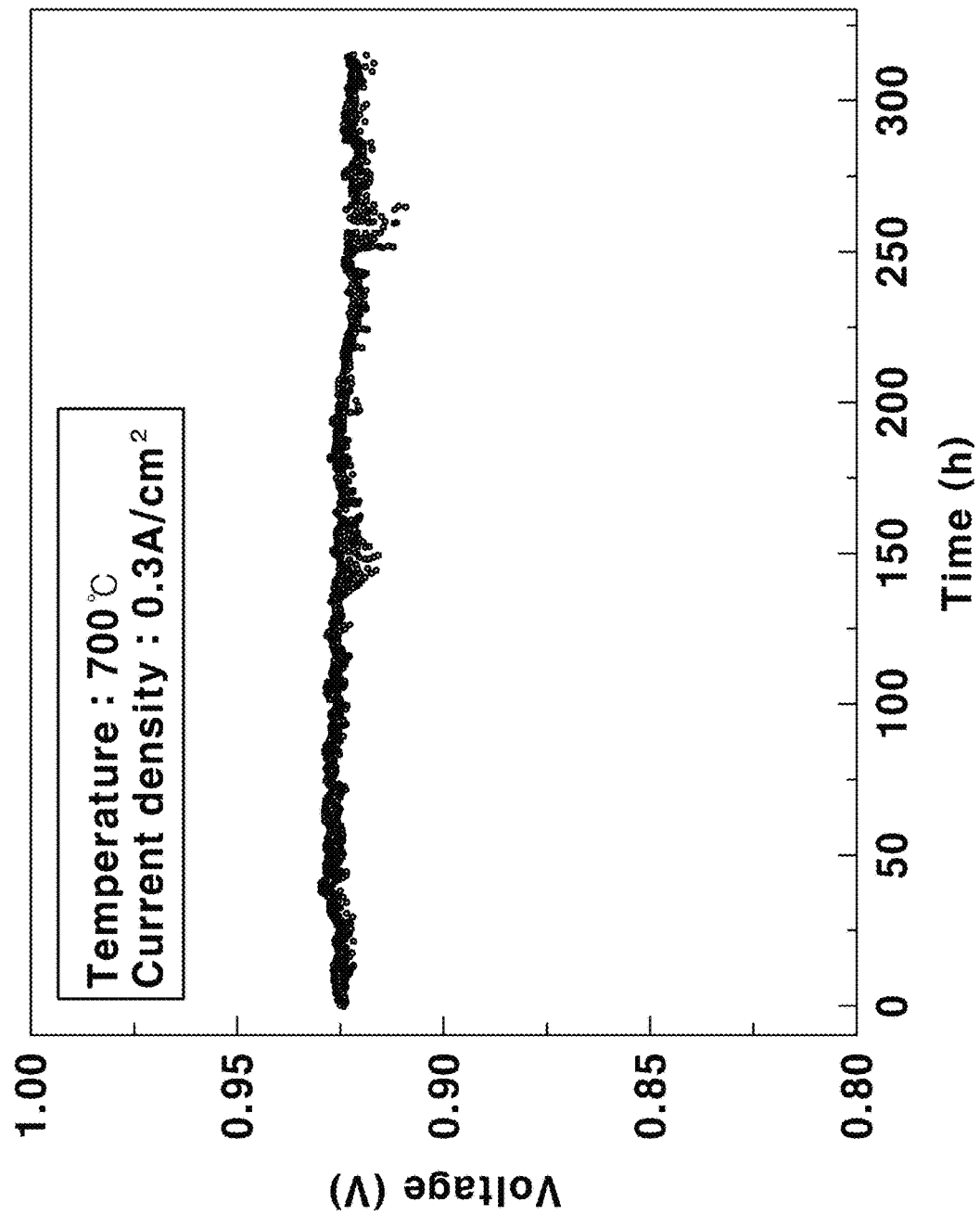
FIG. 10B is a voltage/hour graph of the solid oxide fuel cell after long-term operation under the above conditions for 300 hours.
Figure 11A:
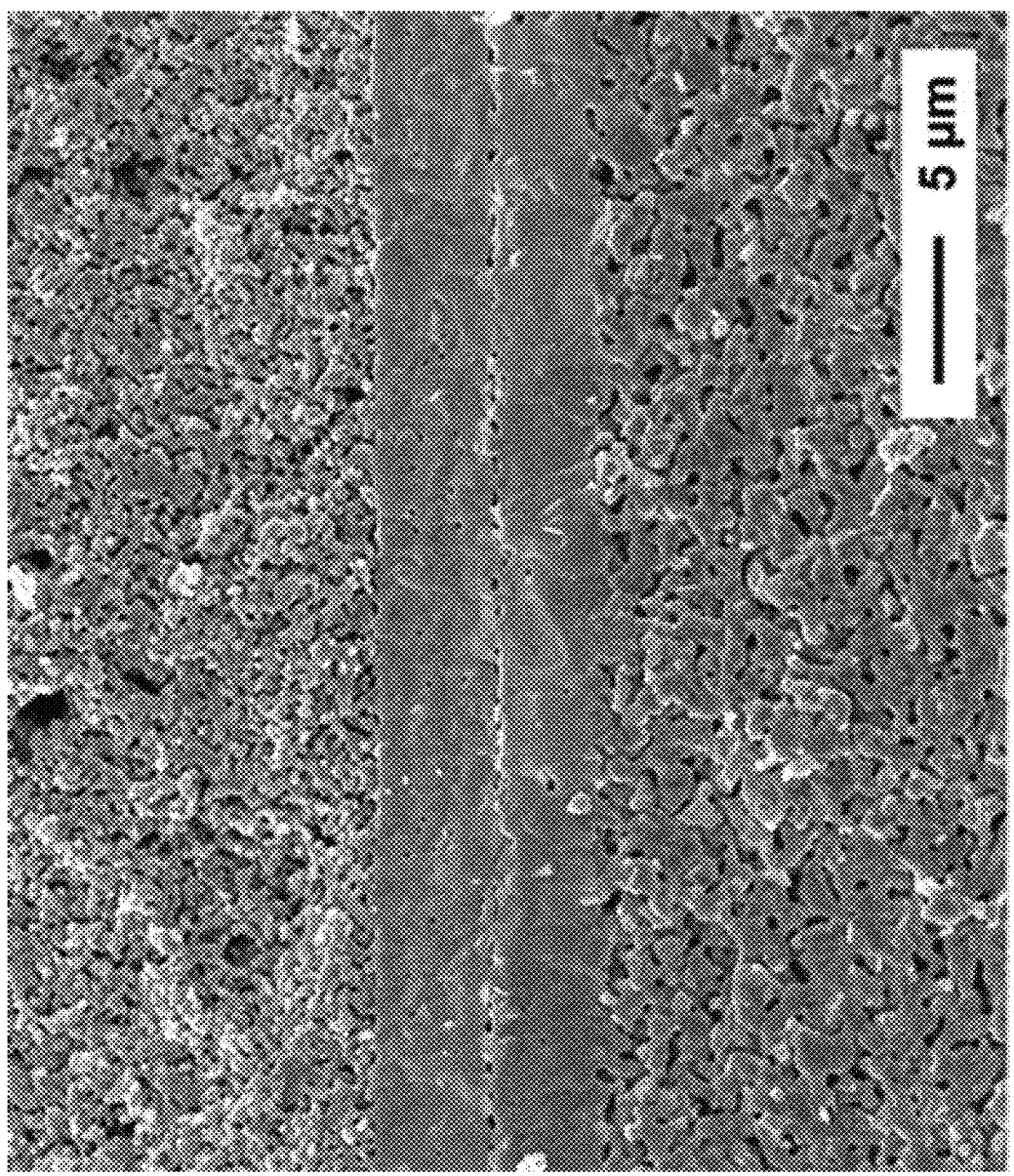
FIG. 11A is a cross-sectional SEM image of the solid oxide fuel cell manufactured according to Example of the present invention before the performance evaluation according to FIG. 10A.
Figure 11B:
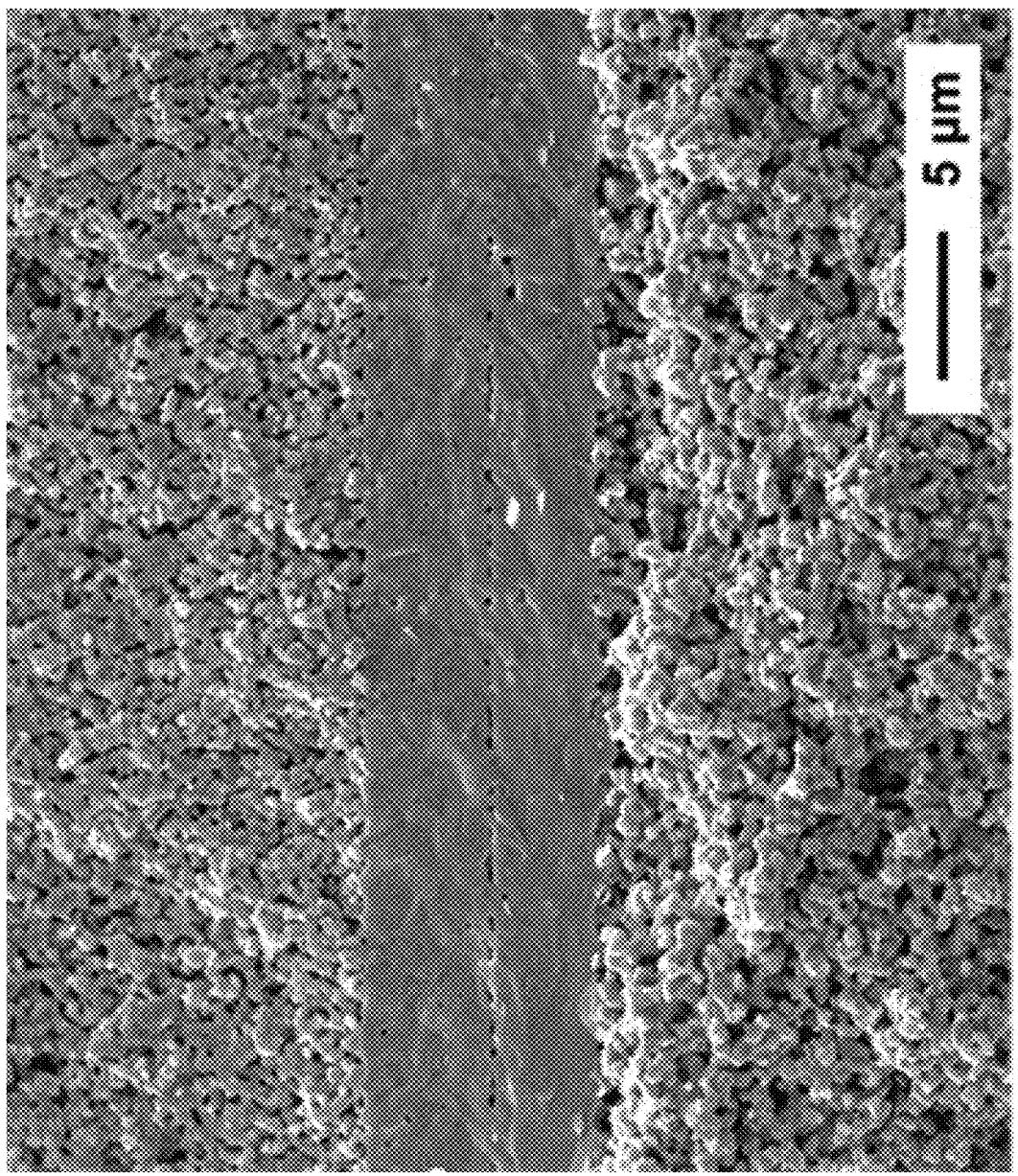
FIG. 11B is a cross-sectional SEM image of the solid oxide fuel cell after the performance evaluation.

Example 4—Evaluation of Electrochemical Performance and Long-Term Stability of Solid Oxide Fuel Cells The results of evaluation of electrochemical performance and long-term stability of the solid oxide fuel cell manufactured according to Example above are shown in FIGS. 10A and 10B and in FIGS. 11A and 11B.

First, as can be seen from FIGS. 10A and 10B, the solid oxide fuel cell manufactured according to Example above had a high maximum power of 47.3 W at an operation temperature of 700° C. and stable performance (performance degradation of 0.21%) at a constant current of 0.3 $A/cm^2$, even during operation for a long period of 300 hours.

In addition, FIGS. 11A and 11B are cross-sectional SEM images of the solid oxide fuel cell after electrochemical performance evaluation. It can be seen from FIGS. 11A and 11B that the microstructure of the bi-layered electrolyte was maintained in the initial state even after long-term operation for 300 hours.

In other words, the solid oxide fuel cell manufactured according to the method of forming a bi-layered electrolyte, which is dense and in which the formation of a secondary phase at the interface is suppressed during the sintering process at a relatively low temperature through the use of a calendering process and a sintering aid, exhibits excellent output characteristics by maintaining high maximum power even upon long-term operation, and exerts long-term stability by maintaining the bi-layered electrolyte layer structure for a long period of time.

As is apparent from the foregoing, the method for manufacturing a solid oxide fuel cell according to the present invention is a continuous process, thus providing high productivity and minimizing facility investment and processing costs.

In addition, the solid oxide fuel cell manufactured by the method according to the present invention includes an anode that is free of interfacial defects and has a uniform packing structure, thereby advantageously greatly improving the production yield and power density.

In addition, the solid oxide fuel cell manufactured by the method according to the present invention has excellent interfacial bonding strength between respective layers included therein, and includes a multi-layered electrolyte layer in which the secondary phase at the interface is suppressed and which has improved densification, thereby advantageously providing excellent output characteristics and long-term stability even at an intermediate operating temperature.

The effects of the present invention are not limited to those mentioned above. It should be understood that the effects of the present invention include all effects that can be inferred from the description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a solid oxide fuel cell, the method comprising:
    preparing a stack comprising at least one anode support layer (ASL) and at least one anode functional layer (AFL);
    calendering the stack to obtain an anode;
    stacking at least one electrolyte layer on the anode to obtain an assembly; and
    calendering the assembly to obtain an electrolyte substrate,
    wherein the at least one electrolyte layer comprises a sintering aid,
    wherein the at least one electrolyte layer is a bi-layered electrolyte layer, and
    wherein the bi-layered electrolyte layer comprises:
        a first electrolyte layer comprising the sintering aid; and
        a second electrolyte layer not comprising the sintering aid.

2. The method according to claim 1, wherein the at least one anode support layer comprises a sheet obtained by tape-casting a slurry comprising at least one selected from the group consisting of nickel oxide (NiO), yttria-stabilized zirconia (YSZ) and a pore-forming agent.

3. The method according to claim 2, wherein the pore-forming agent includes polymethylmethacrylate (PMMA).

4. The method according to claim 2, wherein the slurry contains a solvent selected from the group consisting of alcohol solvents such as methanol, propanol and butanol, BTX solvents such as benzene, toluene and xylene, and combination thereof.

5. The method according to claim 4, wherein the slurry further contains at least one additive such as a binder for improving binding force between respective components, a dispersant for improving a dispersibility, or a plasticizer for improving workability.

6. The method according to claim 1, wherein the at least one anode functional layer comprises a sheet obtained by tape-casting a slurry comprising at least one selected from the group consisting of nickel oxide (NiO) and yttria-stabilized zirconia (YSZ).

7. The method according to claim 1, wherein the stack comprises five to ten anode support layers including the at least one anode support layer, and the at least one anode functional layer disposed on the at least one anode support layer.

8. The method according to claim 1, wherein the anode is obtained by calendering the stack under the following conditions:
calendering rollers have a nip gap not less than 99% and less than 100% of a thickness of the stack, and
the calendering rollers have a rotational speed of 0.3 rotations or fewer per minute.

9. The method according to claim 8, wherein the anode is obtained by calendering the stack under the following conditions:
the calendering rollers have a temperature of 60 to 90° C., and
the calendering rollers have a diameter of 100 mm to 150 mm.

10. The method according to claim 1, wherein the anode is obtained by calendering the stack at least two times.

11. The method according to claim 1, wherein the first electrolyte layer is interposed between the anode and the second electrolyte layer, and comprises a sheet obtained by tape-casting a slurry comprising at least one selected from the group consisting of nickel oxide (NiO), yttria-stabilized zirconia (YSZ) and a pore-forming agent.

12. The method according to claim 11, wherein a content of the sintering aid in the first electrolyte layer is 1 to 5 mol % based on 100 mol % of a total of the first electrolyte layer.

13. The method according to claim 11, wherein the sintering aid comprises at least one selected from the group consisting of iron (Fe), copper (Cu), and cobalt (Co).

14. The method according to claim 1, wherein the second electrolyte layer is disposed on the first electrolyte layer, and comprises a sheet obtained by tape-casting a slurry comprising gadolinium-doped ceria (GDC).

15. The method according to claim 1, wherein the electrolyte substrate is obtained by calendering the assembly under the following conditions:
calendering rollers have a nip gap not less than 90% and less than 95% of a thickness of the assembly; assembly, and
the calendering rollers have a rotational speed of 0.3 rotations or fewer per minute.

16. The method according to claim 1, wherein the electrolyte substrate is obtained by calendering the assembly under the following conditions:
the calendering rollers have a temperature of 60 to 90° C., and
the calendering rollers have a diameter of 100 mm to 150 mm.

17. The method according to claim 1, further comprising sintering the electrolyte substrate.

18. The method according to claim 1, wherein the electrolyte substrate is sintered at 1,200 to 1,300° C.

19. The method according to claim 18, wherein the anode of the sintered electrolyte substrate has a thickness of 0.6 mm to 1.0 mm, and wherein the at least one electrolyte layer has a thickness of 5 μm to 20 μm.

20. The method according to claim 1, further comprising forming a cathode on the at least one electrolyte layer of the electrolyte substrate.

* * * * *